No. 863,864. PATENTED AUG. 20, 1907.
A. MASTER.
FRICTION CLUTCH.
APPLICATION FILED FEB. 4, 1907.
3 SHEETS—SHEET 2.
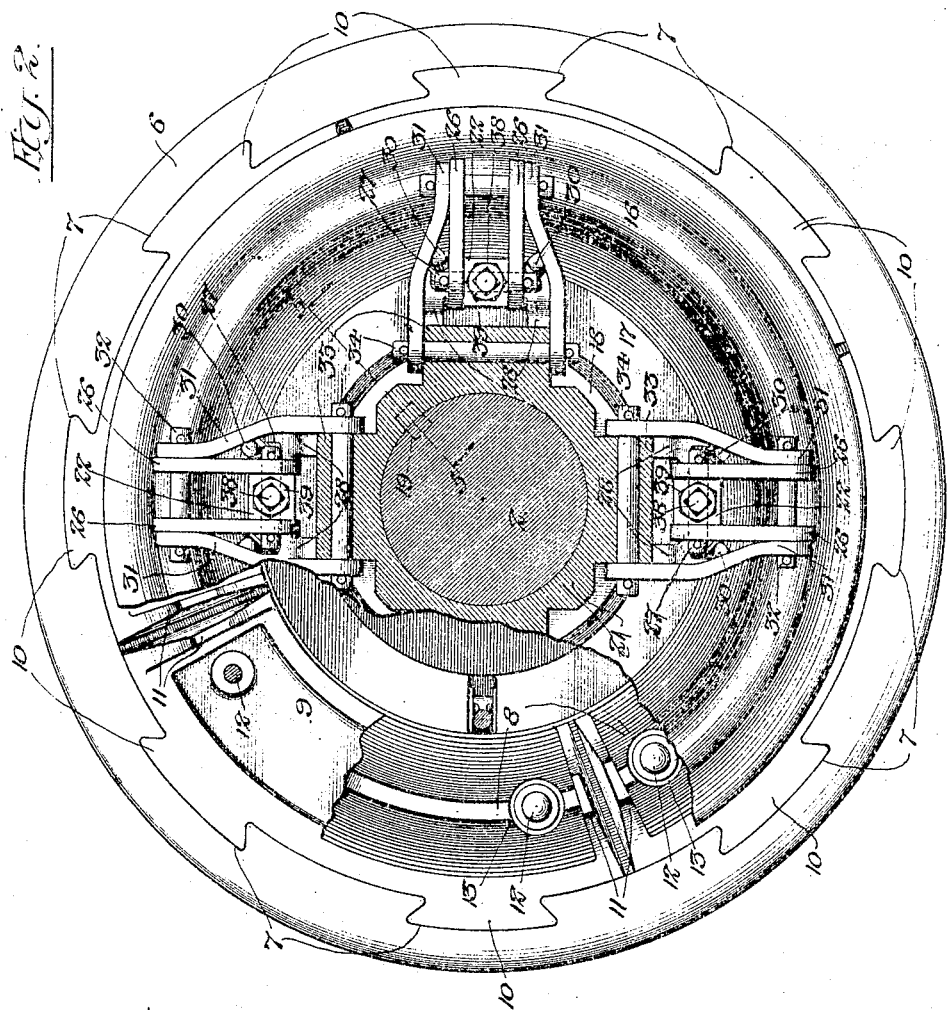
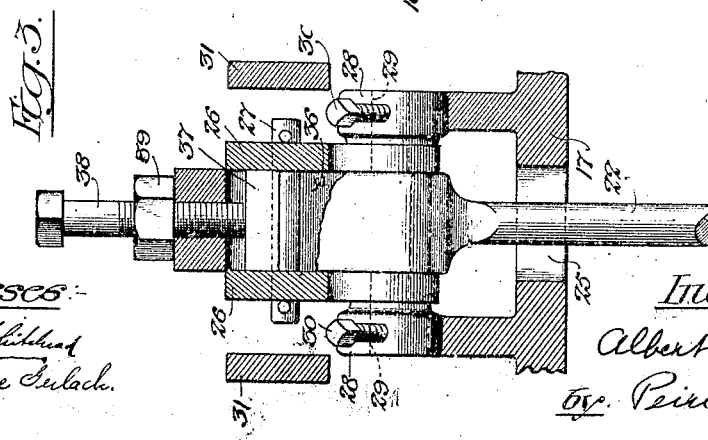
Witnesses:—
Inventor:
Albert Master
by Peirce & Fisher
Attys

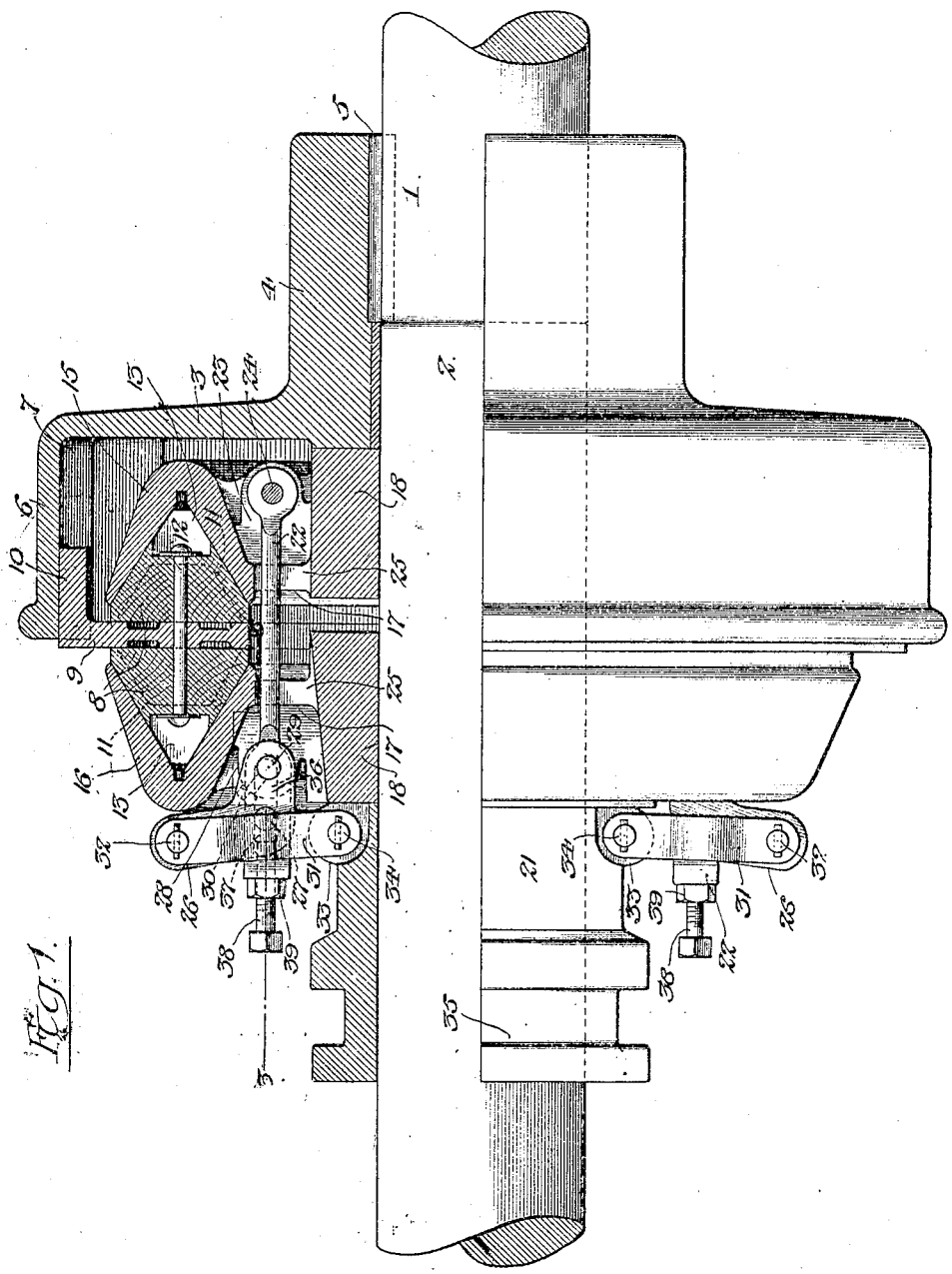

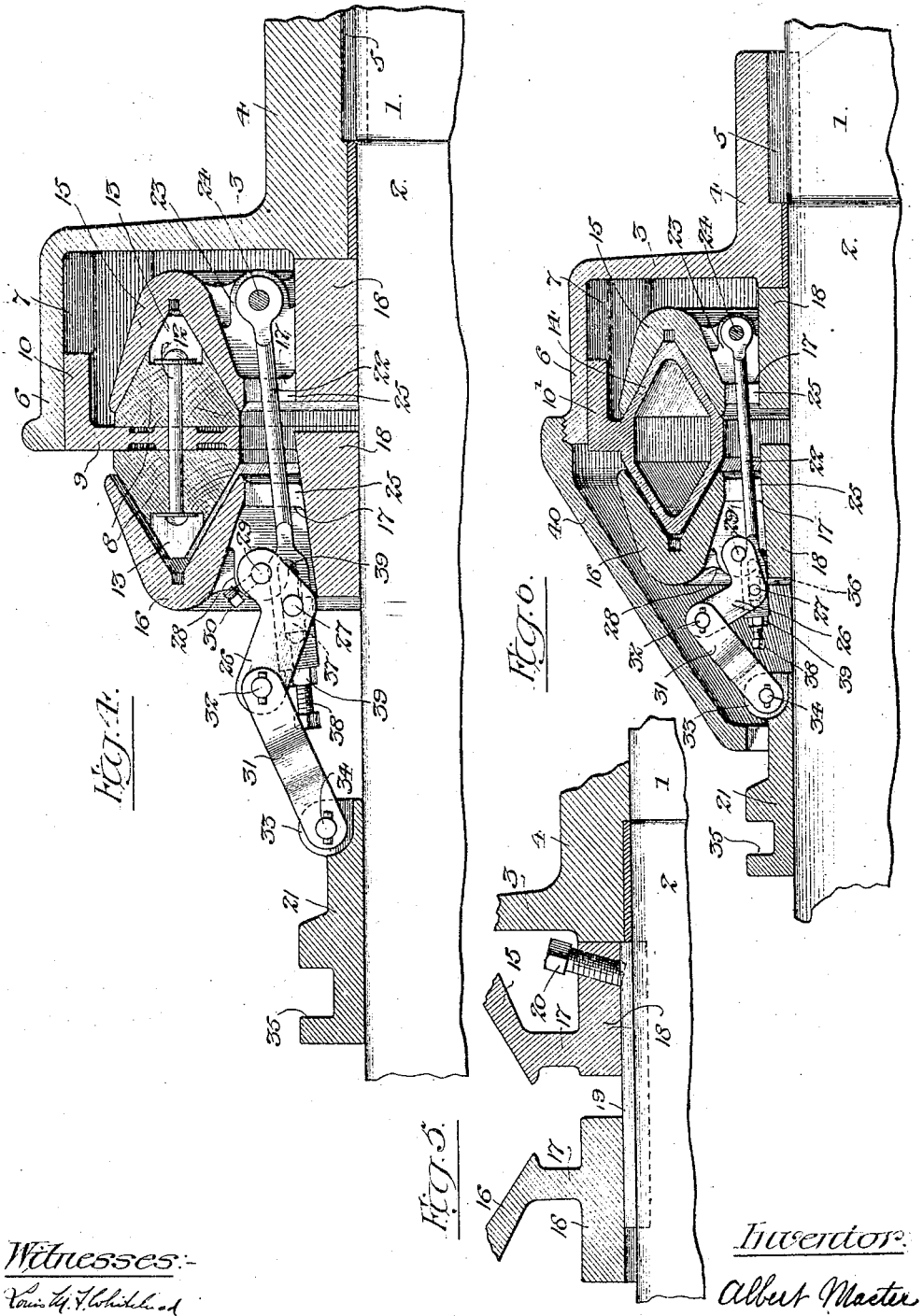

UNITED STATES PATENT OFFICE.

ALBERT MASTER, OF CHICAGO, ILLINOIS.

FRICTION-CLUTCH.

No. 863,864.

Specification of Letters Patent.

Patented Aug. 20, 1907.

Application filed February 4, 1907. Serial No. 355,555.

*To all whom it may concern:*

Be it known that I, ALBERT MASTER, a subject of the Kingdom of Great Britain, residing at Chicago, county of Cook, and State of Illinois, have invented certain new and useful Improvements in Friction-Clutches, of which I do declare the following to be a specification.

The present invention seeks to provide a simple, durable and efficient construction of friction clutch and the invention consists in the features of improvement hereinafter described, illustrated in the accompanying drawings and particularly pointed out in the appended claims.

In the drawings, Figure 1 is a view partially in side elevation and partially in section of the clutch with the parts in closed position. Fig. 2 is a face view of the clutch with parts broken away to show its construction. Fig. 3 is a detail view taken in section on the line 3—3 of Fig. 1. Fig. 4 is a view similar to the sectional portion of Fig. 1 showing the parts of the clutch in open position. Fig. 5 is a detail section on the line 5—5 of Fig. 2. Fig. 6 is a view similar to Fig. 4 showing the modified form of the clutch.

In the accompanying drawings the improved clutch is shown with its members mounted on two shafts arranged in line for connecting and disconnecting such shafts. It will of course be understood that the clutch may be used to connect and disconnect a shaft to a pulley or gear loosely mounted thereon, or in any of the ways in which a friction clutch of this character is commonly employed.

1 and 2 indicate the shafts arranged in axial alinement with their inner ends abutting. Clutch member 3 is disk or wheel shaped and is provided with a hub portion 4 connected by a key 5, or in any other suitable manner to the shaft 1. The clutch member 3 is provided at its periphery with a laterally extending, overhanging part or flange 6, the inner face of which (as clearly shown in Figs. 1 and 2) is provided with a series of axially extending, dove-tailed grooves or guide ways 7. A circular series of friction blocks are carried by the clutch member 3 by means of lugs engaging the dove-tailed grooves or guide-ways 7, so that the friction blocks are supported from the overhanging part or flange 6 but are free to slide or shift independently thereon in axial direction.

In the form shown in Figs. 1, 2 and 4 the friction blocks are made of wood and each is formed of separate segmental sections 8 secured to the opposite sides of a segmental supporting plate 9. The segmental supporting plates 9 are arranged in radial planes and at their outer edges are provided with laterally extending lugs 10 which correspond in shape to and engage the dovetailed grooves or guide ways 7 of the clutch member 3.

In this way the circular series of separate friction
blocks (four in number in the form shown) are sup-
ported upon the clutch member 3 and rotate with it, but may be shifted independently of one another on the clutch member 3 in axial direction. The blocks 8 are preferably V-shaped in section so that their outer working faces are inclined at an acute angle to the axis of the clutch. Each plate 9 for supporting the wooden friction blocks 8 is provided, as shown in Fig. 2, with two lugs 10 engaging two of the corresponding grooves 7 in the flange 6 so that the plates 9 and blocks supported thereby may slide in axial direction without side strain or twist.

The segmental supporting plates 9 are provided at their ends and on opposite sides with laterally offset lugs 11 (see Figs. 1 and 2) which are substantially triangular in shape and against which the ends of the wooden blocks 8 abut and the blocks are secured to the plates by bolts or rivets 12, the heads and washers on the ends of which are arranged on recesses 13 cut in the outer V-shaped edges of the blocks. The supporting plates 9 in the form shown in Figs. 1, 2 and 4, are preferably made of cast metal. In the form shown in Fig. 6 the friction blocks 14 themselves are formed of cast metal, are hollow as shown, and the lugs 10' for engaging the guide grooves 7 of the clutch member 3 are preferably cast in piece therewith, as indicated.

The second clutch member comprises a pair of circular jaws 15 and 16 arranged on opposite sides of the circular series of friction blocks and having grooved working faces with flaring side walls to snugly fit the V-shaped working faces of the blocks. The annular jaws 15 and 16 are mounted upon disks or web plates 17 having central hub portions 18 which, in the form shown, fit snugly upon the shaft 2. The jaws are connected to the shaft 2 to rotate therewith by means of a key 19 (see Fig. 5) or in other suitable manner. The jaw 16 is free to slide upon the shaft 2 but, preferably, the jaw 15 is secured in place thereon by a set screw 20, as shown in Fig. 5. The jaws 15 and 16 are relatively shifted to grip the friction blocks by a series of toggle mechanisms operated by a sliding sleeve 21. There are four of these toggle mechanisms in the form illustrated, and they are alike in construction. Each comprises a rod or link 22 arranged at its inner end between a pair of lugs 23 on the web portion of the jaw 15 and pivoted thereto by a cross pin 24. The links extend outwardly in axial direction through openings 25 in the disk portions or web plates 17 of the jaws. The outer end of each link 22 is arranged between a pair of bell cranks 26 and is pivoted to the angle of the bell cranks by a cross pin 27. The inner short arms of the bell cranks 26 are arranged between lugs 28 (see Figs. 1, 2 and 3) on the web portion of the jaw 16 and are pivotally connected to the lugs by short pins 29 held in place in the lugs by set screws 30. The upper or outer arms of the bell cranks are arranged between the upper ends of a 11 pair of links 31 and are pivotally connected thereto by a cross pin 32. The inner ends of the links 31 are arranged on opposite sides of a series of radial lugs or abutments 33 on the inner end of the sleeve 21 and are pivotally connected to the lugs 33 by cross pins 34. The open position of the clutch is shown in Fig. 4. The sleeve 21 is shown as provided with an annular groove 35 so that it may be shifted axially on the shaft 2 by means of a yoke lever or in any other suitable manner. When the sleeve is shifted inwardly to move the parts of the clutch to closed position shown in Fig. 1, the upper arms of the bell cranks 26 and the links 31 are substantially in line and the lower arms of the bell cranks and the links 22 are substantially in line so that the jaws are forced together upon the friction blocks by what may be termed a double toggle mechanism, so that they may be brought to bear upon the blocks with a large amount of pressure and the parts of the clutch are locked in position by the double toggle lock so that it cannot be forced open or slip.

Means are preferably provided for adjusting the operating mechanism so that the relative shift of the clutch jaws may be regulated, as desired. For this purpose, the outer end of each link 22 is provided with a slot 36 and the cross pin 27 which pivotally connects the links to the bell cranks, is arranged within this slot. A shoe 37 (see Fig. 3) within the slot 36 is provided with a semi-cylindrical face engaging the pin and an adjusting screw 38 threaded through the end of the link 22 bears upon the shoe 37 so that the position of the pin 27 may be adjusted within the slot 36 to vary the throw of the toggle mechanism and take up any wear on the parts. A set nut 39 on the screw 38 holds the parts in adjusted position.

By providing the series of friction blocks having oppositely-disposed V-shaped faces, with the correspondingly shaped oppositely disposed grooved jaws and by mounting the series of blocks so that they may shift independently of one another in axial direction, the jaws are brought to bear with great accuracy upon the blocks so that the clutch provides for a maximum amount of operative gripping surface, and for this reason is extremely efficient. Moreover, with the arrangement shown, the blocks may be very readily removed from position in the clutch for repairs or renewals. It is only necessary to disconnect the shifting toggle mechanism, slide back the clutch jaw 16 and the blocks and segmental plates carrying the same may then be readily removed from the overhanging flange 6 of the clutch member 3. For the same reason the parts may be readily assembled.

The form shown in Fig. 6 is similar in all respects to that shown in the other figures, except that as stated, the friction blocks are formed of cast metal and this form is particularly adapted for use with high speeds. A conical casing 40 is threaded or otherwise secured upon the outer edge of the flange 6 of the clutch member 3 and projects over the operating parts of the clutch so as to form a receptacle in the bottom part of which oil may be placed so that in operation, the parts run in oil. As stated, this form of clutch is especially designed for extremely high speeds where the wooden blocks could not be safely employed on account of the possibility of setting fire to the same by the friction developed between the blocks and the jaws.

It is obvious that numerous changes may be made in the details of construction set forth without departing from the essentials of the invention.

Having described my invention, what I claim as new and desire to secure by Letters Patent, is:—

1. A friction clutch comprising a member having a series of axially extending guide grooves or ways, a circular series of friction blocks having lugs engaging and sliding in said grooves or ways, said blocks being independently shiftable in axial direction upon said clutch member and a second clutch member comprising a pair of oppositely disposed jaws and means for shifting said jaws to grip said friction blocks, substantially as described.

2. A friction clutch comprising a member having an overhanging flange that is provided on its inner face with a series of axially extending guide grooves or ways, a circular series of separate friction blocks arranged within said flange and having projecting lugs engaging said grooves or ways, said blocks being independently shiftable in axial direction upon said clutch member and a second clutch member comprising a pair of oppositely disposed jaws and means for relatively shifting said jaws to engage said blocks, substantially as described.

3. A friction clutch comprising a member having an overhanging part that is provided on its inner face with axially extending, dove-tailed guide ways, a series of friction blocks within said overhanging part having projecting lugs corresponding in shape with and engaging said dove-tailed guide ways to support said blocks in position while permitting the axial movement thereof, said blocks being independently supported and independently shiftable in axial direction upon said clutch member and a second clutch member comprising a pair of oppositely disposed jaws and means for relatively shifting said jaws to grip said series of blocks between them, substantially as described.

4. A friction clutch comprising a member having an offset portion provided with a series of axially extending guide ways, a series of friction blocks having projecting lugs engaging and sliding in said guide ways and a second clutch member comprising a pair of oppositely disposed jaws for engaging said blocks, said blocks being independently shiftable in axial direction and having oppositely arranged V-shaped working faces and said jaws having correspondingly shaped grooved working faces for engaging the V-shaped faces of said blocks and toggle mechanism for relatively shifting said jaws.

5. A friction clutch comprising a member having an overhanging circular flange provided on its inner face with a series of axially extending dove-tailed guide ways, a circular series of independent friction blocks having projecting lugs correspondingly shaped with and slidably engaging said guide ways, said blocks being independently shiftable in axial direction and having oppositely disposed V-shaped working faces and a second clutch member comprising a pair of relatively movable jaws, said jaws having oppositely disposed circular grooves with flaring walls shaped to engage said blocks, and toggle mechanism for relatively shifting said jaws, substantially as described.

6. A friction clutch comprising a disk-shaped member having an overhanging flange provided on its inner face with axially extending guide-ways, a series of separate segmental block supports having projecting lugs slidably engaging the guide-ways of said flange, said block supports being independently shiftable in axial direction upon said flange, wooden blocks secured to the opposite sides of said block supports, and a second clutch member comprising a pair of oppositely disposed jaws arranged to engage said blocks and means for relatively shifting said jaws, substantially as described.

7. A friction clutch comprising a disk-shaped member having an overhanging flange provided on its inner face with axially extending guide ways, a series of separate segmental block supports having projecting lugs slidably engaging the guide ways of said flange said block supports being independently shiftable in axial direction upon said flange and having wooden blocks secured to the opposite sides thereof, said blocks having oppositely arranged V- shaped working faces and a second clutch member comprising a pair of jaws having grooved working faces with flaring walls shaped to slidably engage said V-shaped blocks and toggle mechanisms for relatively shifting said jaws, substantially as described.

8. A friction clutch comprising a member, an overhanging portion provided with a series of axially extending guide ways, a series of separate block supports having projecting lugs engaging and sliding in said guide ways, said block supports being independently shiftable in axial direction upon said overhanging portion, blocks secured to said supports and a second clutch member comprising oppositely disposed jaws for engaging said blocks and means for relatively shifting said jaws, substantially as described.

9. A friction clutch comprising a member having a circular flange on its periphery that is provided on its inner face with axially extending guide ways, a series of separate segmental supporting plates each having two or more lugs on its periphery for slidably engaging said guide ways, said supporting plates being independently shiftable in axial direction upon said flange, wooden blocks secured to the opposite sides of said supporting plates and a second clutch member comprising a pair of oppositely disposed jaws for engaging said blocks and toggle mechanism for shifting said jaws, said jaws and blocks having inclined gripping or working faces, substantially as described.

10. A friction clutch comprising a disk-shaped member, a circular series of friction blocks supported thereby, a second clutch member comprising two oppositely disposed disk-shaped jaws for engaging said circular series of blocks and a series of toggle mechanisms for relatively shifting said jaws, each of said toggle mechanisms comprising a link pivoted to one of said jaws and extending outwardly in radial direction through the web portion of the other jaw, a bell crank to the angle of which said link is pivoted, said bell crank having an inwardly extending arm pivoted to said last mentioned jaw and an outwardly extending arm, a sliding sleeve and a link pivoted to said sleeve and to the outwardly extending arm of said bell crank, substantially as described.

11. A friction clutch comprising a disk member, a circular series of blocks carried thereby, a second clutch member comprising a pair of circular jaws for engaging said blocks between them, and a series of toggle mechanisms for relatively shifting said jaws, each of said toggle mechanisms comprising a link pivoted to one of said jaws and extending outwardly in radial direction through the web portion of the other of said jaws, a pair of bell cranks to the angle of which said link is pivoted, said bell cranks having inwardly extending arms pivoted to said last mentioned jaw and a pair of outwardly extending arms, a sliding sleeve and a pair of links pivoted to said sliding sleeve and to the outwardly extending arms of said bell cranks, each of said toggle mechanisms being arranged to form in effect a double toggle to force said jaws together and securely hold the clutch members in engagement, substantially as described.

12. A friction clutch comprising a member carrying a series of wooden blocks, a second clutch member comprising a pair of oppositely disposed circular jaws and a set of double toggles for operating said jaws, said blocks both rotatable with but independently shiftable in axial direction upon said first mentioned clutch member and having lugs slidably engaging axial guide ways thereon, substantially as described.

13. A friction clutch comprising a disk member, a circular series of blocks carried thereby, a second clutch member comprising a pair of circular jaws for engaging said blocks between them and a series of toggle mechanisms for relatively shifting said jaws, each of said toggle mechanisms comprising a link pivoted at one end to one of said jaws, a pair of bell cranks arranged on opposite sides of the other end of said link and pivoted to the other of said jaws, a cross pin extending between said bell cranks and through a slot in the end of said link, a shoe in said slot engaging said cross pin, an adjusting screw engaging said shoe, a sliding sleeve and a link connection between said sleeve and said bell cranks, substantially as described.

14. A friction clutch comprising a member having a circular flange on its periphery that is provided on its inner face with a series of axially extending, dove-tailed guide grooves, a series of separate segmental, block supports having projecting lugs correspondingly shaped with and slidably engaging said grooves, said block supports being independently supported by said lugs upon said flange and being independently shiftable thereon, friction blocks secured to said block supports and a second clutch member comprising a pair of positively disposed jaws for engaging said series of blocks and toggle mechanism for shifting said jaws, substantially as described.

ALBERT MASTER.

Witnesses:
HARRY L. CLAPP,
GEO. P. FISHER, Jr.